June 4, 1963 — G. SIOMKO — 3,092,778

IMPROVED SWEEP INTEGRATOR SYSTEM

Filed Dec. 7, 1959

INVENTOR.
GEORGE SIOMKO
BY
Robert D. Sanborn
ATTORNEY

United States Patent Office 3,092,778
Patented June 4, 1963

3,092,778
IMPROVED SWEEP INTEGRATOR SYSTEM
George Siomko, Philadelphia, Pa., assignor, by mesne assignments, to Philco Corporation, Philadelphia, Pa., a corporation of Delaware
Filed Dec. 7, 1959, Ser. No. 857,991
15 Claims. (Cl. 328—165)

This invention relates to signal processing systems and more particularly to systems for integrating signals containing periodically recurring pulse series.

In a radar system, the video signal derived from received, target-reflected echo signals consists of a series of pulses occupying a time interval equal to one pulse repetition period of the radar system. This series recurs periodically at the repetition frequency of the radar system with some modification of the series due to target movement or the like. Superimposed on this recurring series of echo pulses is a random signal resulting from the combined effects of ground or sea clutter and noise signals generated within the receiver of the radar system. This random clutter signal makes it difficult if not impossible to detect small amplitude received signals by the use of non-integrating radar receivers.

Integrator circuits, commonly called "sweep integrators," have been developed for improving the signal-to-noise and/or clutter ratio of a radar system. Basically, a sweep integrator consists of a memory circuit, such as an ultrasonic delay line, with a controlled feedback circuit coupling the output of the memory circuit to the input thereof to form a recirculating loop. The delay time of the memory circuit is chosen equal to the radar pulse repetition period. Radar video signals are introduced into the recirculating loop where they are combined with previously introduced radar video signals. An output signal proportional in amplitude to a selected characteristic of the combined signal is derived from the recirculating loop. Sweep integrators operate on the principle that the frequency distribution of a recurrent series of pulses is a line spectrum with the lines located at harmonics of the pulse repetition frequency, whereas the spectrum of random noise and certain types of clutter signals are more or less uniformly distributed over the entire video passband. The sweep integrator is so constructed and arranged that the periodic signals representing echoes from targets add linearly in the recirculating loop, while aperiodic signals resulting from clutter and thermal noise, add in the more gradual root-mean-square manner. As a result, the signal-to-noise and/or clutter ratio in the recirculating loop is greater than the corresponding ratio for the un-integrated signal.

The improvement of the signal-to-noise and/or clutter ratio is a function of the number of successive pulse series stored as a sum in the recirculating loop. The number of pulse series stored in the loop is determined in turn by the intelligence feedback factor of the integrator. The intelligence feedback factor of a sweep integrator is the factor by which a given bit of stored intelligence is altered in magnitude in one loop delay interval. The number of series stored will increase as the intelligence feedback factor approaches the value of one. The intelligence feedback factor must average less than one if the system is to be stable or non-oscillatory.

A favorable signal-to-noise ratio may require a relatively high feedback factor, for example an intelligence feedback factor of the order of 0.85 to 0.95. However a high intelligence feedback factor is generally objectionable in radar systems in which the antenna scans in azimuth since it increases the signal storage time of the system. If the integrator has a high intelligence feedback factor, signals representing a given target are stored in the recirculating loop for several repetition periods after the system has ceased to receive echo signals from that target in space. The utilization circuits of the radar system will be supplied with a signal representing a target as long as a corresponding signal is stored in the integrator. This results in an increase in the apparent azimuthal width of the target in the utilization of circuits of the radar system. This effect is most troublesome when the output of the integrator is made relatively large and then clipped at a relatively low level before it is supplied to the indicator. For example, on a plan position indicator type of display, a small target which should appear as a point or small spot of light on the indicator will appear as an arc of light at a range corresponding to the target range. The length of the arc is a direct function of the intelligence feedback factor of the integrator. For the reasons just mentioned sweep integrators heretofore used with scanning radar systems have employed an intelligence feedback factor which is a compromise between the high feedback factor required to give a desirable signal-to-noise ratio and the relatively low feedback factor which is required to minimize azimuth smear of the target echo signals.

It is an object of the present invention to provide an improved sweep integrator circuit which can provide both a relatively high signal-to-noise ratio and a short residual signal storage time.

Another object of the present invention is to provide a sweep integrator circuit having a relatively high feedback factor when storing signals and a relatively low feedback factor for rapidly clearing the loop once the radar system ceases to receive echoes from a given target.

A further object of the invention is to provide a sweep integrator circuit having different feedback factors for signals of different polarity.

In general, these and other objects of the present invention are achieved by inserting in the control loop of a sweep integrator a circuit which has one fixed gain for positive going signals and a different gain for negative going signals. As a result, the over-all intelligence feedback factor for positive signals in the sweep integrator is greater than the intelligence feedback factor for negative signals.

For a better understanding of the present invention together with other and further objects thereof, reference should now be made to the following detailed description which is to be read in conjunction with the accompanying drawing in which.

Figure 1:
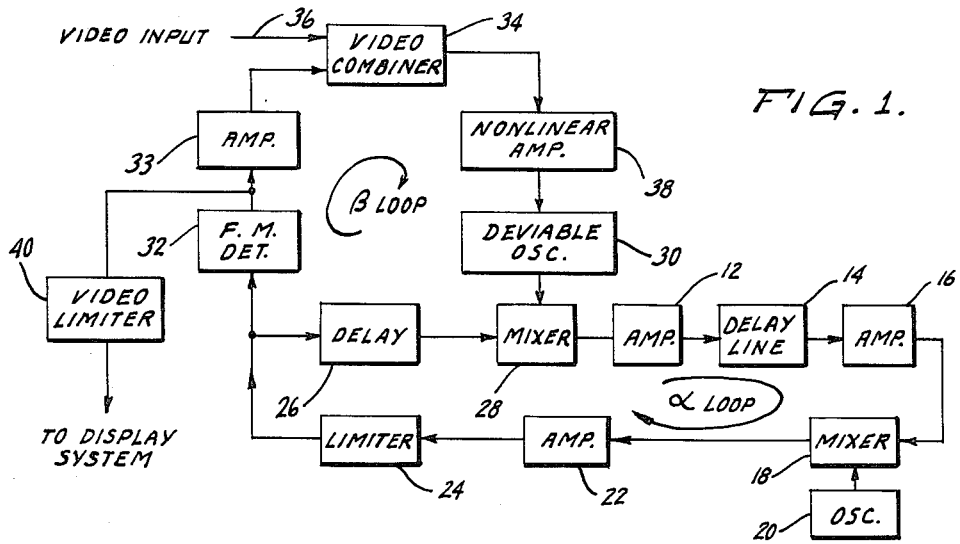
FIG. 1 is a block diagram of a preferred embodiment of the invention.
Figure 4:
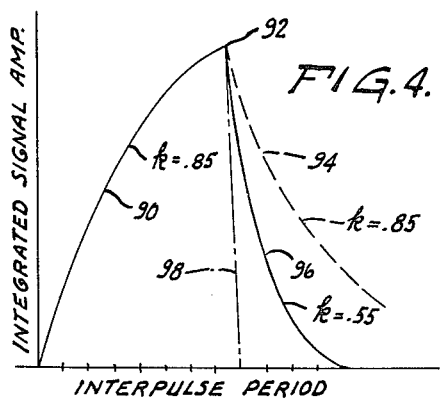

FIG. 4 includes a series of characteristic curves of the embodiment of FIG. 1.

The sweep integrator of FIG. 1 is made up of two loops, the alpha loop and the beta loop. The alpha loop has two general functions. The first function is to generate a carrier frequency signal on which the intelligence signals may be impressed by suitable modulation techniques. The second function is to store this generated signal with any deviations impressed thereon for exactly one repetition period whereby the deviation of the carrier signal which represents a given target is caused to reappear at a selected point in the loop once each repetition period. Intelligence may be impressed on this circulating signal by amplitude modulation, frequency modulation, or phase modulation of the carrier wave. The present invention is applicable to sweep integrators employing any of the modulation methods mentioned above. However, the following description will be limited to a preferred embodiment which employs frequency modulation of the recirculating signal to store the intelligence since the operation of sweep integrators employing other types of modulation will be obvious from the example chosen. The use of frequency modulation to store intelligence is preferred since the operation is not affected by any variations in gain of the various amplifiers or other circuit elements in the loop.

In a frequency modulated sweep integrator, the alpha loop generally has a voltage gain and an intelligence feedback gain of unity for all frequencies within the range to be integrated. By unity voltage gain, it is meant that the amplitude of a signal once introduced in the recirculating loop will continue at that same amplitude indefinitely. This voltage gain may be held at unity by including a signal limiter at any convenient point in the loop. Intelligence feedback gain of the alpha loop may be defined as the ratio of the intelligence stored in a recirculating loop, for one passage of the signal around the recirculating loop, to the intelligence stored in the recirculating loop on the previous passage of the signal around the loop provided no intelligence is added between these two recirculations of the signal. If the intelligence feedback gain is unity, any intelligence, once introduced into the recirculating loop, will continue to circulate indefinitely unless removed by some other means.

The beta loop of FIG. 1 performs three functions. The first function is to provide stability of the carrier frequency generated by the alpha loop. The second function is to reduce the effective intelligence feedback factor of the entire integrator below the value of unity established by the alpha loop. The third function of the beta loop is to provide a path for introducing intelligence into the alpha loop.

Turning now more specifically to the block diagram of FIG. 1, the alpha loop comprises a driver amplifier 12 which is connected to the input of delay line 14. Delay line 14 may be in any form of delay line having a delay time approximately equal to the pulse repetition period of the radar system or the circuit with which the sweep integrator is associated. Since this period is usually relatively long, delay line 14 is preferably an ultrasonic delay line having a solid delay medium. A post-delay amplifier 16 is coupled to the output of delay line 14 to compensate for the attenuation of the signal in delay line 14. The output of amplifier 16 is connected to one input of a heterodyne mixer 18. An oscillator 20 supplies a fixed frequency signal to a second input of mixer 18. A signal having a frequency equal to the sum (or the difference) of the two signals supplied to mixer 18 is supplied through a third amplifier 22 and a limiter 24 to the input of a second delay network 26. Delay network 26 is provided to compensate for the delay encountered by a signal passing through the beta loop. In general, the delay encountered in the beta loop is small. Therefore network 26 may be a section of coaxial line, an ultrasonic delay line or any convenient wide band delay network.

The signal at the output of delay network 26 is supplied to one input of a second heterodyne mixer 28. The second input to mixer 28 is obtained from a deviable oscillator 30 in the beta loop. The output of mixer 28 is coupled to the input of driver amplifier 12 to complete the alpha loop.

As mentioned above, the delay of delay line 14 is only approximately equal to the pulse repetition period of the incoming signal. It is the total delay around the alpha loop, including the delays in delay means 26 and in amplifiers 12, 16 and 22 and mixers 18 and 28, that is made equal to the pulse repetition period of the incoming signal.

The distribution of amplifiers 12, 16 and 22 around the alpha loop and the placement of limiter 24 in the loop are to be taken solely as illustrative of one preferred arrangement of the alpha loop, but in no sense is the invention limited to the arrangement shown.

A signal from the output of limiter 24 is supplied to the input of a frequency modulation detector 32 in the beta loop. Detector 32 may be any convenient form of frequency modulation detector circuit such as a Foster-Seely discriminator circuit. The center frequency of detector 32 is made equal to the carrier frequency of the alpha loop at the output of limiter 24. The output of detector 32 is coupled to one input of video combiner circuit 34 by a video amplifier 33. The second input 36 of video combiner circuit 34 receives the unintegrated signals from the system, for example a radar system, associated with the sweep integrator. In its simplest form signal combiner 34 may be a resistor-adder network of the type employed to add or mix audio or video signals. As will be explained in more detail presently, video combiner circuit 34 provides output signals of one polarity if the signals received on input 36 exceed in amplitude the signals supplied by amplifier 33, and output signals of the opposite polarity if the signals provided by amplifier 33 exceed in amplitude the signals received at input 36. This may be accomplished by properly selecting the polarities of the signals that are supplied by input 36 and amplifier 33. The output of video combiner circuit 34 is coupled to the control input of deviable oscillator 30 through a non-linear amplifier 38. Amplifier 38 has a gain for signals of one polarity which is greater than the gain of signals of the opposite polarity.

Figure 2:
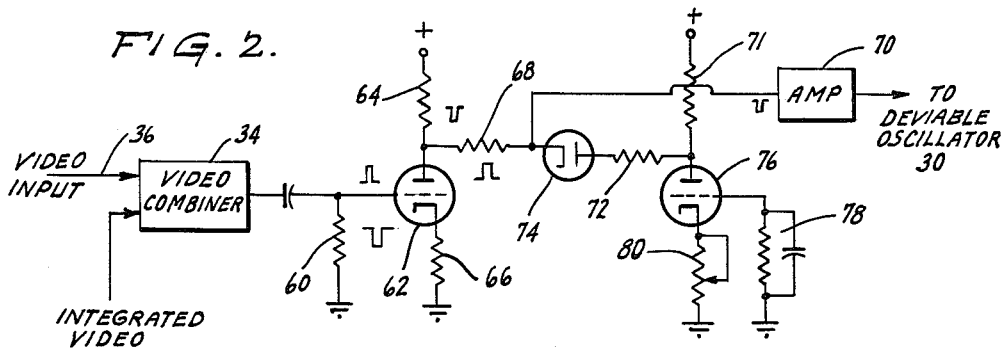
FIG. 2 is a schematic diagram of the non-linear amplifier in the block diagram of FIG. 1.

A schematic diagram of an amplifier having the desired type of characteristic is shown in FIG. 2. The video pulses from video combiner 34 are supplied by way of resistor-capacitor coupling network 60 to the control grid of pulse amplifier tube 62. Pulse amplifier tube 62 is provided with the usual anode load resistor 64 and a small cathode load resistor 66. Resistor 66 tends to linearize the characteristics of the amplifier tube 62. It also plays a part in the zero setting circuit presently to be described. The anode of tube 62 is connected through a resistor 68 to a conventional inverting amplifier 70. The function of amplifier 70 is to compensate for the phase reversal which takes place in amplifier tube 62.

If the circuit shown in FIG. 2 is to be inserted in an existing sweep integrator, the over-all gain from the output of video adder 34 to the output of amplifier 70 should be unity for the portion of the circuit just described. Obviously the circuit may have either a higher or lower gain provided the gain of amplifier 33 is appropriately chosen or suitable attenuators or amplifiers are inserted to bring the over-all gain of the beta loop to the appropriate value.

Resistors 71 and 72 and diode 74 are connected in shunt with the series combination of resistors 64 and 68. Diode 74 is connected so that its anode and cathode are at the same potential when the pulse signals supplied to the grid of tube 62 are at their zero level. The anode of diode 74 is held at the proper potential relative to its cathode by means of a second electron tube 76 which has its control grid connected to ground through the parallel resistor-capacitor combination 78. An adjustable resistor 80 is provided in the cathode circuit of tube 76 as a means for adjusting the average plate current through tube 76 and hence the direct potential at the anode of this tube.

It will be seen from FIG. 2 that positive pulses supplied to the grid of tube 62 will drop the potential of the anode of tube 62. Since the cathode of diode 74 is now negative with respect to its anode, the series combination of resistors 68, 71 and 72 will be in parallel with resistor 64 and the amplifier stage including tube 62 will have a relatively low gain. The effective gain of the amplifier stage is further reduced by the fact that resistors 68, 71 and 72 act as a voltage divider so that only a fraction of the signal appearing at the anode of tube 62 is coupled to the input of amplifier 70. If a negative signal is supplied to the grid of tube 62, the anode of tube 62 will become more positive, diode 74 will be an open circuit and resistor 64 will comprise the sole anode load for tube 62. Since resistor 66 alone presents a higher resistance than the resistors 64, 68, 71 and 72 of the beta loop which will now be considered. The 32.6 megacycle signal appearing at the input of F.M. detector 32 causes a small video signal to appear at the output of this circuit. The characteristic of detector 32 and amplifier 33 and video combiner 34 are so chosen that the 32.6 megacycle signal supplied to the input of detector 32 produces a pulse at the output of combiner 34 which has a polarity opposite to that of the original pulse supplied to input 36. This may be accomplished by constructing detector 32 so that a negative video pulse appears at its output in response to a momentary decrease in the frequency of the signal supplied to its input. If detector 32 is a Foster-Seeley discriminator, the polarity of the output pulse is determined by the polarity of the diodes in the discriminator circuit. Alternatively detector 32 may produce a positive pulse at its output in response to a momentary decrease in the frequency of the signal supplied to its input and amplifier 33 may produce an inversion of this positive pulse. In either event, combiner 34 merely passes this negative pulse to its output. The pulse at the output of amplifier 33 is small compared to the amplitude of the pulse originally supplied at input 36. For example, if the integrator is to have an over-all effective loop gain of 0.85, the amplitude of the pulse at the output of amplifier 33 will be approximately 1 minus 0.85 or 0.15 unit. In prior art sweep integrators this small pulse at the output of video combiner 34 would produce a correspondingly small decrease in the frequency of oscillator 30. Thus in prior art circuits the negative pulse having an amplitude of 0.15 unit would decrease the frequency by 0.15×0.1 megacycle or .015 megacycle, the 0.1 megacycle being the frequency shift produced by the original positive pulse. As explained in detail in the above-cited patent, this small frequency shift produced by the beta loop brings about the slow decay of intelligence stored as a frequency shift in the alpha loop.

In the present invention, unlike the prior art, the small negative signal from video combiner 34 is caused to have a much greater effect in proportion to its amplitude on the frequency of oscillator 30 than the positive signal appearing at the output of combiner 34. This is accomplished by causing amplifier 38 to have a much greater gain for negative signals than for positive signals. Thus if the gain of the non-linear amplifier 38 for negative signals is 1/.15 or 6.67 times the gain for positive signals, the negative pulse from combiner 34 will cause the frequency of oscillator 30 to decrease to 80.9 megacycles for the duration of the pulse. The 80.9 megacycle pulse will heterodyne with the 48.4 megacycle pulse supplied by delay line 26 in mixer 28. The signal supplied to amplifier 12 will have a frequency of 32.5 megacycles, the average frequency of the alpha loop. Thus the frequency deviation which passed around the alpha loop is completely cancelled and the alpha loop restored to its average carrier frequency.

Suppose now that the assumed conditions of operation are altered so that a second video pulse is supplied to video combiner 34 at the time the circulating frequency deviation caused by the first pulse reappears at the input to mixer 28. Under these conditions deviable oscillator 30 will be shifted in frequency by an amount proportional to the algebraic sum of the signal resulting from the second video pulse and the degenerative video signal derived from amplifier 33. This signal will be positive since the positive input pulse on input 36 has an amplitude greater than that of the negative pulse supplied by amplifier 33 and so will receive the lower of the two possible amplifications afforded by amplifier 38. Thus, the frequency of oscillator 30 will be approximately (81+0.1−.015) or 81.085 megacycles per second. The signal supplied by mixer 28 to driver 12 will have a frequency equal to 81.085 minus 48.4 megacycles or 32.685 megacycles per second.

If an uninterrupted series of video pulses, all having the same amplitude, is supplied to adder 34, the frequency shift in the alpha loop resulting from these pulses will increase until the degenerative shift in frequency resulting from the action of detector 32 is equal to the regenerative shift in frequency supplied by the next video signal. In the example given above this will occur when the total deviation stored in the alpha loop is approximately equal to $$\frac{1}{1-.85}$$

or seven times the deviation resulting from a single pulse. Under the conditions given above the output signal of F.M. detector 32 will be a video signal which is approximately seven times the amplitude of the signal resulting from the application of one pulse to the alpha loop. However, the amplitude of the noise at the output of F.M. detector 32 is much less than seven times the amplitude of the noise supplied with the video signals to adder 34. This is due to the fact that the noise adds in a root-mean-square manner in the recirculating loop while the video pulses add in a linear manner.

If the gain of the beta loop is reduced to a value less than .15 the sweep integrator will have a higher over-all gain and equilibrium will not be achieved until a signal in the alpha loop is more than seven times the amplitude of the input signal. For example, if the gain of the beta loop is reduced to .05, the stabilization will not occur until the signal recirculating in the alpha loop is shifted in frequency to approximately 20 times the shift introduced by a single pulse.

Suppose now that equilibrium has been reached in response to the application of a series of pulses to the input 34. Suppose further that the application of pulses to input 34 ceases. In practice this might occur when a scanning antenna no longer illuminates a target in space. The large amplitude signal in the alpha loop produces a signal at the amplifier 33 which is equal in amplitude but opposite in polarity to one of the pulse signals previously supplied to input 36.

As explained above, the higher gain of amplifier 38 for negative signals brings about a rapid decay of the stored intelligence. If the gain of amplifier 38 for negative signals is equal to $$\frac{1}{1-k}$$

where $k$ is the over-all feedback factor of the integrator system, the shift in frequency of oscillator 30 will be exactly equal to but opposite in direction to the deviation circulating in the alpha loop. As a result, the signal at the output of mixer 28 will be restored to its normal value of 32.5 megacycles one repetition period following the cessation of pulses to input 36. Expressed in another way, the decay time for stored intelligence will be a minimum when the gain of the beta loop for negative signals is the reciprocal of the gain for positive signals. This relationship assumes that the beta loop is the only portion of the integrator which affects the over-all intelligence feedback factor.

If the gain of amplifier 38 for negative pulses is greater than $$\frac{1}{1-k}$$

the frequency shift of deviable oscillator 30 will be greater than the stored frequency shift of the recirculating signal so that the direction of frequency shift of the recirculating signal will be reversed. The circuit will then tend to hunt about the average frequency until the stored in parallel, the stage including tube 62 will have a higher gain for negative pulses than it has for positive pulses. The break in the gain characteristic will come at the point where diode 74 ceases to conduct. This can be adjusted to coincide with the zero input level of the signals supplied to the grid of tube 62 by adjustment of resistor 80. The difference between the gain of the amplifier for positive pulses and the gain for negative pulses can be controlled by selecting resistors 64, 68, 71 and 72 to give the appropriate change in load impedance when diode 74 conducts. Some sweep integrator circuits may provide a negative pulse from video combiner 34 if the amplitude of the pulse on input 36 exceeds that of the pulse supplied by amplifier 33. Amplifier 38 may be made to have a greater gain for negative pulses than for positive pulses by reversing the polarity of diode 74.

Figure 3:
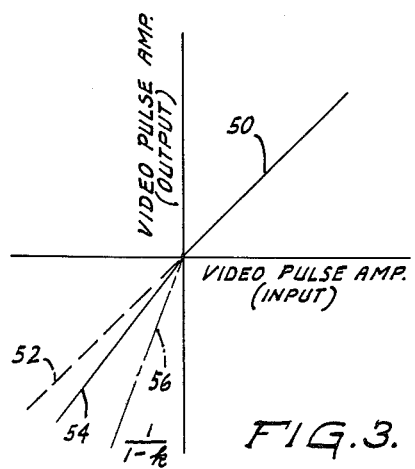
FIG. 3 is a plot showing the gain characteristic of the circuit of FIG. 2.

The input signal amplitude versus output signal amplitude characteristic of amplifier 38 is shown in FIG. 3. A gain of unity for positive signals is indicated by the line 50 in FIG. 3. Unity gain for negative signals is indicated by the dashed line 52 of FIG. 3. The actual gain of amplifier 38 for negative signals is made greater than unity as indicated by line 54 so that the amplitude of the negative pulses at the output of amplifier 38 will be greater than the amplitude of the corresponding negative pulses at the input of amplifier 38. As will become clear later, any increase in the gain of amplifier 38 above the value of unity for negative pulse signals will increase the rate of signal decay in the recirculating loop upon the loss of the input signal. However, maximum rate of decay of stored information is achieved when the gain of amplifier 38 is equal to $$\frac{1}{1-k}$$

for negative pulse signals, where $k$ is the over-all intelligence feedback factor. This value of gain is represented by the broken line 56 of FIG. 3.

The output of the sweep integrator of FIG. 1 is taken from the output of detector 32 in the beta loop. The output signal at this point is an integrated video signal which may be applied directly to a conventional cathode ray tube indicator. A limiter such as limiter 40 of FIG. 1 may be employed to limit the maximum amplitude of the output signal to prevent "blooming" on the screen of the cathode ray tube indicator.

If it is desired to obtain an integrated signal at some carrier frequency rather than at video, it is possible to extract such a signal from any convenient point in the alpha loop. Three preferred points would be the output of amplifier 16, the output of amplifier 22 or the output of limiter 24, since the signals at these points are at a relatively high amplitude level. For reasons which will appear presently, the carrier frequencies at two of these points differ from one another by an amount equal to the shift in frequency introduced by mixer 18.

The operation of a sweep integrator, which is similar to the integrator of FIG. 1 except for the non-linear amplifier 38 in the beta loop, is described in detail in United States Patent 2,736,021. The operation of a sweep integrator will be reviewed briefly herein in order that the function of non-linear amplifier 38 in the beta loop may be more readily appreciated. If no information is stored in the alpha loop and no pulses are being supplied to input 36 a constant frequency-constant amplitude signal will circulate around the alpha loop. This signal will have one carrier frequency between the output of mixer 28 and the input of mixer 18 and a second carrier frequency between the output mixer 18 and the input of mixer 28. The undeviated frequency of oscillator 30 is selected so that the frequency shift introduced by mixer 28 is equal in amplitude but opposite in direction to the frequency shift introduced by mixer 18.

In the following description it will be assumed that the alpha loop has a natural frequency of oscillation measured between the output of mixer 18 and the input of mixer 28 of 48.5 megacycles. The average frequency of the alpha loop can be held at this value by causing the crossover frequency of detector 32 to be 48.5 megacycles. Amplifier 33 is caused to have a relatively high gain for low frequency signals, that is below the repetition frequency of the pulses to be integrated. As a result, the beta loop will degenerate any slow drift of the carrier frequency of the alpha loop from the desired value of 48.5 megacycles. Further by way of example, it will be assumed that deviable oscillator 30 has an average frequency of 81 megacycles and that oscillator 20 has a constant frequency of 81 megacycles.

Thus if no intelligence is stored in the recirculating loop, the signal between the output of mixer 28 and the input of mixer 18 will have a frequency of 81 minus 48.5 or 32.5 megacycles per second. Driver 12, delay line 14 and amplifier 16 have relatively wide passbands, for example approximately 9 megacycles, centered at this frequency. The phasing of the signal around the beta loop is such that the beta loop tends to degenerate any frequency shift which appears in the alpha loop. However, since the signal supplied to the input of detector 32 when no intelligence is stored in the loop is equal to the zero signal point or crossover point of this detector, there is no signal passing around the beta loop and oscillator 30 continues to oscillate at its average frequency of 81 megacycles per second.

Suppose now that a single video pulse, for example a positive pulse, is supplied to input 36 of video combiner 34. This pulse will be supplied to the input of oscillator 30 by way of amplifier 38 and will cause the frequency of deviable oscillator 30 to shift momentarily from its assumed frequency of 81 megacycles by an amount proportional to the amplitude of the video signal. In this illustration it will be assumed that the video pulse shifts the frequency of deviable oscillator 30 by 0.1 megacycle. The frequency of oscillator 30 thus becomes 81.1 megacycles but only for the duration of the applied positive pulse. This signal, when heterodyned in mixer 28 with the 48.5 megacycle carrier signal received from delay network 26, will cause the frequency of the signal supplied to driver amplifier 12 to shift to 32.6 megacycles for the duration of the input pulse. The 32.6 megacycle signal will pass through delay line 14 and amplifier 16 to mixer 18 where it is heterodyned with the 81 megacycle signal from oscillator 20 in mixer 18. The signal supplied to amplifier 22 will be at a frequency of 48.4 megacycles for the duration of the pulse supplied to input 36. This 48.4 megacycle signal will reappear at the input of mixer 28 at a time after the initial shift in frequency by deviable oscillator 30 which is equal to the delay time around the alpha loop. If it is assumed that deviable oscillator 30 is once again operating at its normal frequency of 81 megacycles, the 48.4 megacycle signal will be heterodyned with the 81 megacycle signal to supply a second signal of 32.6 megacycles to amplifier 12. It should be remembered that this second 32.6 megacycle signal occurs for only a brief interval of time equal to the duration of the original video pulse. At all other times the signal to driver amplifier 12 is at a frequency of 32.5 megacycles which is the difference between the natural frequency of oscillation of the alpha loop and the average frequency of oscillator 30. The fact that the short duration 32.6 megacycle signal, initially generated by the momentary deviation of the frequency of oscillator 30, continues to circulate around the loop at that same frequency, is illustrative of the fact that the alpha loop has a unity intelligence feedback gain.

It has been assumed that oscillator 30 remains at a frequency of 81 megacycles except when deviated by a signal on input 36. This assumption ignores the effect deviation eventually decays to zero. If the gain of amplifier 38 for negative signals is less than $$\frac{1}{1-k}$$

two or more repetition periods will be required to dispose of the stored intelligence.

Curve 90 in FIG. 4 represents the build-up of the integrated signal in the recirculating loop in response to the application of a continuous series of pulses of uniform amplitude, these pulses being spaced apart by the delay time of the alpha loop. The apex 92 of curve 90 represents the point at which input pulses to the sweep integrator cease. If the gain of the beta loop is the same for positive pulses as it is for negative pulses, the stored information will decay along the relatively slowly decreasing exponential curve 94. If the gain of the beta loop is greater for negative pulses than for positive pulses, the actual decay of the stored intelligence may be along the line such as line 96 of FIG. 4. If the gain of amplifier 38 is equal to $$\frac{1}{1-k}$$

the stored information will be erased in one pulse repetition period as illustrated by the broken line 98.

Since the stored information can be caused to decay very quickly, the over-all intelligence feedback factor can be made very high to provide optimum signal-to-noise ratio without causing objectionable smearing in azimuth of the target indications. The maximum signal-to-noise ratio is achieved once equilibrium has been reached in the sweep integrator. The rapid decay of the stored information, once incoming signals cease, does not adversely affect the signal-to-noise ratio.

The above examples assume that the video signals supplied to input 36 are derived from a single target. It will be obvious to those skilled in the art that signals from several targets at different ranges can be integrated at one time. The pulses from the different targets will appear at correspondingly different times at any point in the integrator. Therefore the buildup and decay of the integrated pulses representing a given target will be entirely independent of the buildup and decay of integrated signals representing other targets.

While the invention has been described with reference to the preferred embodiment thereof, it will be apparent that various modifications and other embodiments thereof will occur to those skilled in the art within the scope of the invention. Accordingly I desire the scope of my invention to be limited only by the appended claims.

What is claimed is:

1. A sweep integrator system for processing signals having periodic components, said system comprising a recirculating signal loop, said loop including a delay means for causing signals circulating in said loop to have a predetermined transit time around said loop, said transit time being equal to the period of said periodic components of said signal to be processed, said loop including means for causing a signal at a substantially constant frequency to be circulated in said loop, means for causing a shift in the frequency of said circulating signal proportional to the instantaneous amplitude of an applied signal, means coupled to said loop for generating a signal having an instantaneous amplitude proportional to the instantaneous frequency of said recirculating signal at the point of coupling, means for receiving signals to be processed by said system, signal combining means having first and second inputs and an output, said second input being coupled to said signal generating means and said first input being coupled to said signal receiving means, said signal combining means providing an output signal of one polarity if the amplitude of the signal at the first input thereof exceeds a first value which is dependent upon the amplitude of the signal provided by said signal generating means and has an opposite polarity if the amplitude of the signal at said first input thereof does not exceed said first value, signal transfer means coupling said output of said signal combining means to said frequency shifting means to control the operation thereof, said signal transfer means having a higher gain for signals of one polarity than for signals of the opposite polarity.

2. A sweep integrator as in claim 1 wherein the gain of said signal transfer means for signals of said one polarity is the reciprocal of the gain for said signals of the opposite polarity.

3. A system for integrating periodically recurring pulse series, said integrating system comprising delay means, a feedback circuit coupling at the output of said delay means to the input thereof, thereby to form a recirculating signal loop, the signal transit time around said loop being equal to the interpulse period of said pulse series to be integrated, means forming a part of said feedback loop for normally maintaining an approximately constant amplitude, fixed frequency recirculating signal in said loop, a period of one cycle of said recirculating signal being short compared to the delay time of said delay means, pulse operated frequency changing means also forming a part of said signal loop, said frequency changing means being operative to cause the frequency at a point in said loop to shift by an amount proportional to the amplitude of a pulse supplied to said frequency changing means, the duration of said frequency shift at said point being equal to the duration of said pulse, frequency sensitive means coupled to said loop, said frequency sensitive means being operative to generate an output video signal having an instantaneous amplitude proportional to the instantaneous deviation from said fixed frequency of the frequency at the point coupling of said loop, a signal combining circuit, means coupling the output of said frequency sensitive means to a first input of said signal combining circuit, means for supplying the signals to be integrated to a second input of said signal combining circuit, and signal transfer means coupling the output of said signal combining circuit to the input of said frequency changing means, said signal transfer means having a first gain for amplitudes of the signal supplied to said second input of said signal combining means which are at least equal to a first value, said first value being equal to a first constant plus the product of the amplitude of the signal supplied to said first input of said signal combining means and a second selected constant, said signal transfer means having a different gain for amplitudes of the signal supplied to said second input which are less than said first value.

4. A sweep integrator system for processing signals having periodic components, said system comprising a recirculating signal loop, said loop including a delay means for causing signals circulating in said loop to have a predetermined transit time around said loop, said transit time being equal to the period of said periodic components of said signals to be processed, said loop including means for causing a signal at a substantially constant frequency to be circulated in said loop, modulating means for modulating said circulating signal in accordance with the instantaneous amplitude of an applied signal, signal generating means coupled to said loop for generating a signal having an instantaneous amplitude proportional to the modulation of said recirculating signal at the point of coupling, signal combining means having a first input coupled to said signal generating means, means for supplying signals to be integrated to a second input of said signal combining means, the instantaneous polarity of the output signal of said signal combining means being dependent upon the relative amplitudes of the signal supplied to the two inputs thereof, signal transfer means coupling the output of said signal combining means to said modulating means to control the operation thereof, said signal transfer means having a higher gain for signals of one polarity than for signals of the opposite polarity.

5. A sweep integrator system as in claim 4 wherein said signal transfer means comprises an amplifier, said amplifier having a higher effective anode load impedance for signals of one polarity than for signals of the opposite polarity.

6. A sweep integrator as in claim 3 wherein said first constant has the value zero and said second constant has the value one.

7. A sweep integrator system as in claim 3 wherein said first constant has the value zero and said second constant has the value one and wherein said different gain is greater than said first gain.

8. A sweep integrator system as in claim 3 wherein said different gain is greater than said first gain and has a value between one and $$\frac{1}{1-k}$$

where $k$ is the overall intelligence feedback factor of said sweep integrator system for input signals having an amplitude greater than said first value.

9. A sweep integrator system for processing signals having periodic components, said system comprising a delay means and means coupling the output of said delay means to the input thereof to form a recirculating signal loop, the signal propagation time around said loop being equal to the period of said periodic components of said signals to be processed, a degenerative auxiliary loop coupled to said recirculating signal loop for reducing the over-all intelligence feedback factor of said integrator system to a value less than unity, said degenerative signal loop including means for receiving said signals to be processed by said sweep integrator system, and means in said degenerative loop for causing the over-all intelligence feedback factor of said system to have one value if the magnitude of the input signal to said sweep integrator system bears one relationship to the magnitude of a selected characteristic of the signal circulating in said loop and a second value if the magnitude of the input signal bears a different relationship to said selected characteristic of said signal circulating in said loop.

10. A sweep integrator system for processing signals having periodic components, said system comprising a delay means and means coupling the output of said delay means to the input thereof to form a recirculating signal loop in which intelligence may be stored as a modulation of the signal circulating in said loop, the signal propagation time around said loop being equal to the period of said periodic components of said signals to be processed, input means for receiving said signals to be processed by said sweep integrator system, said signals to be processed representing by a selected parameter the intelligence to be integrated, an auxiliary loop coupled to said recirculating signal loop for reducing the over-all intelligence feed-back factor of said sweep integrator system, said auxiliary loop comprising means for deriving from said recirculating signal loop a signal having a parameter representative of the degree of modulation of the signal circulating in said recirculating signal loop, signal combiner means coupled to said two last-mentioned means for combining the signal supplied thereby, signal responsive modulating means coupled to said recirculating signal loop for altering the degree of modulation of said signal circulating in said recirculating signal loop, and a variable gain circuit coupling the output of said signal combiner means to said modulator means, the gain of said variable gain circuit being dependent upon the magnitude of said input signal relative to said degree of modulation of said circulating signal.

11. A sweep integrator system for processing signals having periodic components, said system comprising a delay means and means coupling the output of said delay means to the input thereof to form a recirculating signal loop in which intelligence may be stored as the modulation of the signal circulating in said loop, the signal propagation time around said loop being equal to the period of said periodic components, input means for receiving video signals to be processed by said sweep integrator, an auxiliary loop coupled to said recirculating signal loop for reducing the over-all intelligence feedback factor of said sweep integrator system, said auxiliary loop comprising means coupled to said recirculating signal loop for deriving a video signal having an amplitude variation representative of the time variation of the modulation of the signal in said recirculating signal loop at the point of coupling of said auxiliary loop to said recirculating signal loop, signal combiner means coupled to said two last-mentioned means for combining the signals supplied thereby, modulating means coupled to said recirculating signal loop, said modulating means being responsive to the amplitude of a signal supplied thereto for altering the degree of modulation of said signal circulating in said recirculating signal loop, and a variable gain circuit coupling the output of said signal combiner means to said modulator means, the gain of said variable gain circuit being dependent upon the relative magnitudes of the signal supplied to the two inputs of said combiner means.

12. A sweep integrator system for processing signals having periodic components, said system comprising a delay means and means coupling the output of said delay means to the input thereof to form a recirculating signal loop in which intelligence may be stored as a modulation of the signal circulating in said loop, the signal propagation time around said loop being equal to a period of said periodic components of said signals to be processed, input means for receiving video signals to be processed by said sweep integrator system, an auxiliary loop coupled to said recirculating signal loop for reducing the overall intelligence feedback factor of said sweep integrator system, said auxiliary loop comprising means coupled to said recirculating signal loop for deriving a video signal having an amplitude variation representative of the time variation in the modulation of the signal in said recirculating signal loop at the point of coupling of said auxiliary loop to said recirculating signal loop, signal combiner means coupled to said two last-mentioned means for combining the signals supplied thereby, modulating means coupled to said recirculating signal loop and responsive to the amplitude of a signal supplied thereto for altering the degree of modulation of said signal circulating in said recirculating signal loop, and a variable gain circuit coupling the output of said signal combiner means to said modulation means, said variable gain circuit having a gain of one magnitude for instantaneous signal amplitudes at one input of said signal combiner means which are equal to or greater than a first value which is equal to a first selected constant plus the product of a second constant and the instantaneous amplitude of the signal supplied to the second input of said signal combiner means, said variable gain circuit having a gain of a different magnitude for instantaneous signal amplitudes at said first input of said signal combiner means which are less than said first value.

13. A sweep integrator system for processing signals having periodic components, said system comprising a delay means and means coupling the output of said delay means to the input thereof to form a recirculating signal loop in which intelligence may be stored as a modulation of the signal circulating in said loop, input means for receiving periodic video signals to be processed by said sweep integrator system, the signal propagation time around said recirculating signal loop being equal to the period of periodic components of said video signals, an auxiliary loop coupled to said recirculating signal loop for reducing the over-all intelligence feedback factor of said recirculating signal loop, said auxiliary loop comprising means coupled to said recirculating signal loop for deriving a video signal having an amplitude variation representative of the time variation in the modulation of the signal in said recirculating signal loop at the point of coupling of said auxiliary loop to said recirculating signal loop, signal combiner means coupled to the said two last-mentioned means for combining signals supplied thereby, said signal combiner means providing an output signal of one polarity if the instantaneous amplitude of the signal supplied to one input thereof is equal to or greater than a first value, said first value being equal to a first constant plus the product of a second constant and the instantaneous amplitude of the signal supplied to said second input of said signal combiner means, said signal combiner means providing an output signal of the opposite polarity if the instantaneous amplitude of the signal supplied to said first input thereof is less than said first value, modulating means coupled to said recirculating signal loop and responsive to the amplitude and polarity of the signal supplied thereto for altering the degree of modulation of the signal circulating in said recirculating signal loop, and a variable gain circuit coupling the output of said signal combiner means to said modulator means, said variable gain circuit having a greater gain for signals of said one polarity than for signals of said opposite polarity.

14. A sweep integrator system in accordance with claim 13 wherein said variable gain circuit has a gain for signals of said one polarity equal to C times the gain for signals of said opposite polarity, where C is a constant having a value between one and $$\frac{1}{1-k}$$

$k$ being the over-all intelligence feedback factor of said sweep integrator system for signals causing said variable gain circuit to have the lower of said two values of gain.

15. A sweep integrator system as in claim 13 wherein the gain of said variable gain means for signals of said one polarity is the reciprocal of the gain for signals of said opposite polarity.

References Cited in the file of this patent
UNITED STATES PATENTS

| | | |
|---|---|---|
| 2,841,704 | Sunstein et al. | July 1, 1958 |
| 2,991,467 | Clarke | July 4, 1961 |